United States Patent [19]

Peters et al.

[11] 3,786,323

[45] Jan. 15, 1974

[54] CAPACITOR WITH ANODIZED ELECTRODE OF TANTALUM SILICON ALLOY

[75] Inventors: Frank Groom Peters, Nutley; Newton Schwartz, Morris Township, Morris County, both of N.J.

[73] Assignee: Bell Telephone Laboratories, Incorporated, Murray Hill, N.J.

[22] Filed: July 3, 1972

[21] Appl. No.: 268,588

[52] U.S. Cl. .............. 317/258, 29/25.42, 204/38 A, 252/512

[51] Int. Cl. .............. H01g 1/01

[58] Field of Search .............. 317/258; 252/512, 252/518; 204/38 A; 29/25.42

[56] References Cited

UNITED STATES PATENTS 3,483,451 12/1969 Lerer .............. 317/258

OTHER PUBLICATIONS

IEEE Transactions on Component Parts, "Evaluation Vapor Plated Oxide Film for Capacitor Dielectrics" pp. 119–122

*Primary Examiner*—E. A. Goldberg
*Attorney*—E. M. Fink

[57] ABSTRACT

A thin film material capable of functioning as the anode in electrochemically formed thin film capacitors and as the resistive track in anodized resistors in thin film integrated circuits comprising a film of sputtered tantalum and silicon.

5 Claims, 9 Drawing Figures

CAPACITOR WITH ANODIZED ELECTRODE OF TANTALUM SILICON ALLOY

This invention relates to a technique for the fabrication of thin film components and to the resultant devices. More particularly, the present invention relates to a technique for the fabrication of thin film components including a layer of a tantalum-silicon alloy, such components being of particular interest for use as the anode in electrically formed thin film components and as the resistive track for anodized resistors.

DESCRIPTION OF THE PRIOR ART

1. Background of the Invention

Miniaturization of components and circuitry coupled with the increasing complexity of modern electronic systems have created an unprecedented demand for reliability in thin film components. Furthermore, the extraordinary terrestrial and interplanetary environments created by the space age have further increased the severity of the problems associated with component realiability. Heretofore, most of the requirements of stability, precision and miniaturization have been fulfilled simultaneously by the use of tantalum capacitors wherein elemental tantalum or a component thereof has been utilized in the form of a thin film.

Although these materials have been found to be eminently qualified for use in such applications, workers in the art have long sought suitable alternatives, particularly for use in circuits including both resistors and capacitors. Heretofore, it has been conventional to utilize beta-tantalum as the capacitor anode and tantalum nitride as the resistive material in such structures. The preparation of such structures could be considerably simplified if a single material were available which was considered desirable for use in both components.

2. Summary of the Invention

In accordance with the present invention, this end is attained by the use of a sputtered film of a tantalum-silicon alloy as the thin film material in the components of interest. Briefly, the inventive technique involves sputtering a layer of a tantalum-silicon alloy comprising from 2.5 to 35 weight percent silicon, remainder tantalum, upon a nonconducting substrate and fabricating the desired components by any conventional technique. Devices so fabricated have been found to evidence excellent initial yield and stability characteristics and compare favorably with prior art structures.

BRIEF DESCRIPTION OF THE DRAWING

The invention will be more readily understood by reference to the following detailed description taken in conjunction with the accompanying drawing wherein.

DETAILED DESCRIPTION OF THE DRAWINGS

Figures 1A, 1B, 1C, 1D, 1E:
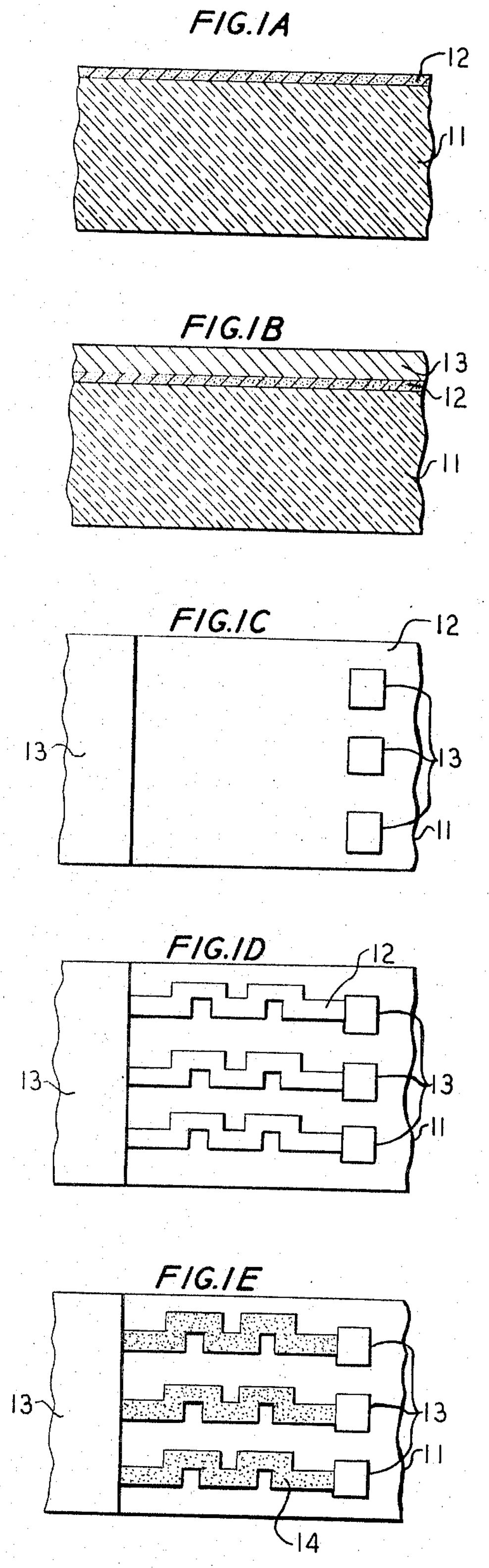
FIGS. 1A through 1E are plan views of a resistor produced in accordance with the present invention in successive stages of fabrication.

With further reference now to FIG. 1A, there is shown a plan view of a substrate member 11 upon which a tantalum-silicon alloy 12 has been deposited. In accordance with the present invention, film 12, a tantalum-silicon alloy may be produced by any convenient sputtering technique. Typically, this may involve reactive sputtering of tantalum in a silane ($SiH_4$)-argon ambient, sputtering of a tantalum-silicon sintered composite cathode, ac sputtering of tantalum and silicon water cooled rods, etc.

The tantalum-silicon alloy material 12 may then be coated with a conductor 13 for example, a titanium-palladium-gold composite to produce the structure shown in FIG. 1B. Thereafter, a suitable conductor pattern may be generated by photolithographic techniques to yield the structure shown in FIG. 1C. Next, the resultant assembly is further photolithographed to form a resistor pattern shown in FIG. 1D. The tantalum-silicon alloy is next immersed in an anodizing electrolyte and made positive with respect to another electrode immersed in the electrolyte to yield an oxide film 14 shown in FIG. 1E. The structure may then be trim anodized in the manner described in U.S. Pat. No. 3,148,129, issued Sept, 8, 1964 and/or thermally preaged in the manner described in U.S. Pat. No. 3,159,556, issued Dec. 1, 1964.

As disclosed, the invention comtemplates the use of a substrate upon which the component of interest is to be produced. Suitable substrate materials are those which conform to the requirements imposed by the various process stages. It is preferred the substrate be relatively smooth in nature and able to withstand temperatures of the order of 600°C to which they may be subjected during the deposition process. All types of refractory materials such as glass, ceramics and the like, meet these requirements.

The sputtering technique employed in depositing the desired film of tantalum-silicon alloy, as indicated, may conveniently be selected from among reactive sputtering of tantalum in the presence of silane maintained at a partial pressure within the range of $3.0 \times 10^{-4}$ to $7.0 \times 10^{-4}$ torr in $10 \times 10^{-3}$torr of argon, ac rod sputtering and composite tantalum-silicon cathode sputtering. In the practice of the invention it has been found that the composition of the deposited alloy must range from 2.5 to 35 weight percent silicon, remainder tantalum, in order to yield an efficacious device. Compositions containing less than 2.5 weight percent silicon manifest the beta-tantalum crystallographic structure rather than the microcrystalline structure of the tantalum-silicon alloy. Although the noted maximum of 35 weight percent silicon is acceptable for resistor purposes, capacitor applications impose a maximum limit of 12 weight percent beyond which the dissipation factor of the material becomes unacceptable. The 35 weight percent maximum for resistors is dictated by considerations relating to the temperature coefficient of resistance. Beyond that maximum this parameter becomes too negative for useful device applications. Thus, the range of interest for producing a useful thin film material is from 2 to 35 weight percent silicon, remainder tantalum, the preferred range for capacitor applications being from 2 to 12 weight percent silicon, remainder tantalum.

Figures 2A, 2B, 2C, 2D:
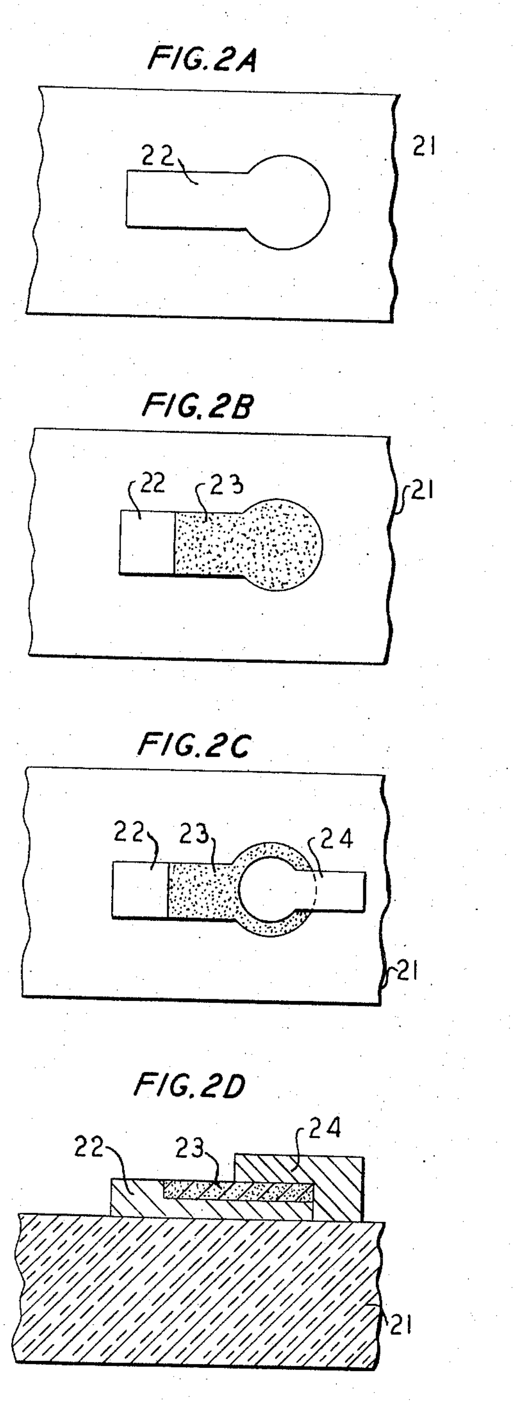
FIGS. 2A through 2D depict a capacitor produced in accordance with the present invention in successive stages of fabrication.

With reference now to FIG. 2A there is shown a plan view of a substrate member 21 suitable for use in the fabrication of a capacitor in accordance with the present invention, upon which a tantalum-silicon alloy film 22 has been deposited. The alloy film 22 so deposited may then be immersed in a typical anodizing electrolyte and made positive with respect to another electrode immersed in the electrolyte. Anodization is conducted for a time period sufficient to yield an oxide film 23 shown in FIG. 2B. As noted in this Figure, a portion of original alloy layer 22 does not have an oxide coating. This oxide film portion includes the part of layer 22 to which the anodizing potential source was connected and, accordingly, was not immersed in the electrolyte.

The next step in the fabrication of a capacitor involves depositing a counter-electrode upon oxide film 23. This is most conveniently accomplished by vacuum evaporation techniques. Shown in FIG. 2C is counter electrode 24 in contact with oxide film 23.

FIG. 2D is a front elevational view in cross section of the structure of FIG. 2C. As may be seen in FIG. 2D, the original alloy layer 22 underlies oxide coating 23. The portion of layer 22 which extends beyond the oxide layer 23 furnishes a means of making electrical connection to the site of the capacitor.

Examples of the present invention are described in detail below. These examples are included merely to aid in the understanding of the invention, and variations may be made by one skilled in the art without departing from the spirit and scope of the invention.

Example 1.

This example describes the fabrication of a resistor in accordance with the invention.

A cathodic sputtering apparatus comprising a glass bell jar having disposed therein a 6 inch square tantalum cathode was employed in conjunction with a 6 inch oil diffusion pump system having a liquid nitrogen trap. A glass microscope slide was used as the substrate. Initially, the slide was cleansed by conventional techniques to produce a clean surface. The first step in the deposition process involved heating the substrate to a temperature of approximately 500°C for two hours after which it was cooled for an additional 2 hours to a temperature of approximately 100°C. After the heat treatment, the background pressure in the apparatus was in the range of $5 \times 10^{-8}$ torr and then increased slightly to $9 \times 10^{-8}$ torr when the system was throttled. Following, silane was admitted into the chamber in an amount sufficient to establish a partial pressure of approximately $3 \times 10^{-4}$ torr and argon added thereto to establish a total pressure of 10 millitorr. Presputtering with a shutter covering the substrate was conducted for 40 minutes to allow the system to attain equilibrium and a film of a silicon-tantalum alloy 4,000 A in a thickness was deposited after 45 minutes. The composition of the resultant film was 2.5 percent silicon, remainder tantalum.

Following, the substrate was degreased with FREON and 500 A of titanium, 1,000 A of palladium and 10,000 A of gold were deposited thereon by evaporation, the substrate being heated to a temperature of approximately 200°C. Then, a conventional photoresist was deposited upon the resultant assembly, and terminals and resistors generated by photolithographic techniques, a solution of potassium triiodide being used to etch the gold and palladium, a solution comprising 20 parts by volume hydrofluoric acid and one part water being used to etch the titanium and a solution comprising 5 parts by volume hydrofluoric acid, one part nitric acid and one part water being used to remove the tantalum-silicon alloy. Following, the assembly was stabilized by baking at 250°C for 5 hours. Finally, the resultant resistors were anodized to 100 volts at a current density of 15.5 milliamperes per square centimeter. The resistors so prepared evidenced a resistivity of approximately 205 microhm-cm, a temperature coefficient of resistance of about −118 ppm/C° and a stability of −0.04 percent after 1,000 hours at 150°C.

Example 2.

The deposition procedure of example 1 was repeated with the exception that the film had a silicon content of 7.8 weight percent, such being attained by the utilization of a silane partial pressure of approximately $4 \times 10^{-4}$ torr. The substrate was next degreased with FREON and a desired pattern generated thereon by conventional photolithographic techniques, an etching solution comprising 5 parts, by volume, hydrofluoric acid, one part nitric acid and one part water being used to etch the tantalum-silicon alloy. Following removal of the photoresist and a second degreasing step, the tantalum-silicon film was anodized to 230 volts in 0.01 percent citric acid solution at a current density ranging from 0.15 to 0.45 milliamperes per square centimeter. Next, the assembly was again degreased and 500 A of a nickel-chromium alloy and 10,000 A of gold were evaporated upon the substrate. A photoresist was then applied and a counter electrode pattern generated utilizing potassium triiodide to etch the gold and hydrochloric acid to etch the nickel-chromium alloy. Finally, the photoresist was removed, the assembly degreased and the resultant capacitors evaluated. The capacitor evidenced a capacitance density of 0.28 picofarads per square mil, a dissipation factor at 1 kHz less than 0.0035, a temperature coefficient of capacitance of +200 over a temperature ranging from 25° to 65°C, a leakage current at 50 volts of the order of 0.033 amperes per farad and a step-stress breakdown voltage of approximately 130 volts.

What is claimed is:

1. A thin film capacitor including a substrate member having deposited thereon successively a layer of an anodizable material, an anodic oxide layer of said anodizable material and a counter electrode, characterized in that said anodizable material is a layer of a sputtered tantalum-silicon alloy comprising from 2.5 to 12 weight percent silicon, remainder tantalum.

2. Technique for the fabrication of a thin film capacitor which comprises the steps of successively depositing upon a nonconducting substrate member a layer of an anodizable material, an anodic oxide of said anodizable material and a counter electrode characterized in that said anodizable material is formed by sputtering a layer of a tantalum-silicon alloy comprising from 2.5 to 12 weight percent silicon, remainder tantalum.

3. Technique in accordance with claim 2 wherein said anodizable material is formed by reactive sputtering of tantalum in a silane argon-mixture.

4. Technique in accordance with claim 2 wherein said anodizable material is formed by ac sputtering of tantalum and silicon water cooled rods.

5. Technique in accordance with claim 2 wherein said anodizable material is formed by sputtering a sintered cathode of tantalum and silicon in pure argon.

* * * * *